Aug. 26, 1958 M. EBER 2,848,801
METHOD OF MAKING CERAMIC METAL SEAL
Filed Jan. 4, 1954
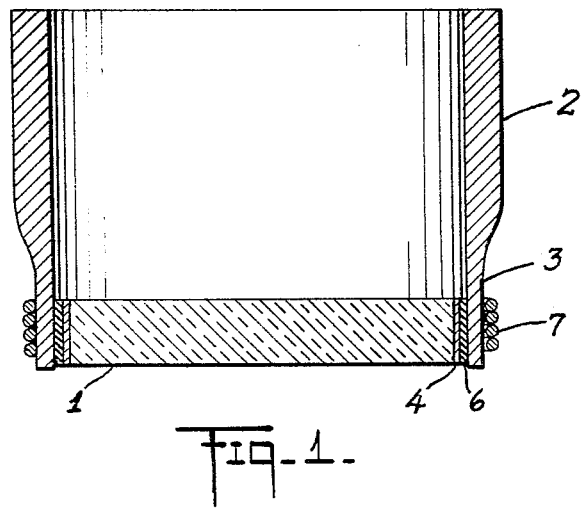
Fig-1-
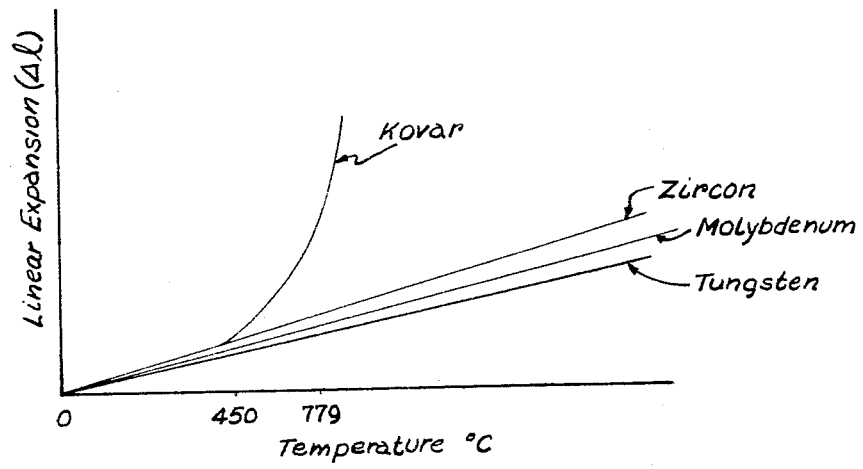
Fig-2-
INVENTOR:
Mortimer Eber
By George Sipkin
Paul U. Mitchell Jr.
ATTORNEYS

United States Patent Office 2,848,801
Patented Aug. 26, 1958

2,848,801

METHOD OF MAKING CERAMIC METAL SEAL

Mortimer Eber, West Orange, N. J., assignor, by mesne assignments, to the United States of America as represented by the Secretary of the Navy Application January 4, 1954, Serial No. 402,193

6 Claims. (Cl. 29—472.9)

This invention relates to vacuum-tight seals and, more particularly, to methods for bonding together ceramics and metal in a hermetically-tight manner.

In the science of electronic tube engineering, as well as in other fields, the ability to bond together ceramics and metals into strong, effective seals has assumed real importance and efforts along these lines have discovered a number of materials that possess such similar thermal expansion characteristics, as well as strong adherent capacities in the presence of soldering compounds, as to be capable of being bonded into effective seals. One of the more notable discoveries has been that of the affinities of glass and certain iron, nickel and cobalt alloys, commonly known as Kovar, although the use of Kovar has been limited mostly to the sealing of particular types of glass, such as the conventional borosilicate glass which has expansion characteristics closely paralleling Kovar. There are many advantages in the glass-Kovar seals in electronic tube engineering, such as the freedom of design permitted by these seals.

It also is known that in some circumstances certain other ceramics can be used to greater advantage in that these others permit higher tube baking temperatures on exhaust and also because they possess improved electrical characteristics and stabilities as compared with glass. One outstanding example of these other ceramics is zircon porcelain, which not only possessses the advantages mentioned above, but which, in addition, is a low-cost material that is easily fabricated. However, zircon-metal seals have not been used generally, and, in fact, the only presently known use of these seals in electronic tube engineering has required a bond between zircon and molybdenum, which it will be recognized is an unusually high-cost material adapted for use permanently in situations where the seal metal must exhibit excellent non-magnetic qualities.

Apparently, the difficulty which has prevented a general use of the zircon, and all other ceramics of a similar nature, such as those including titanium, hafnium, thorium, etc., has been the fact that these materials are relatively incompatible insofar as their coefficiencies of expansion are concerned. Thus, when a zircon-Kovar assembly is subjected to soldering heat, the two materials expand uniformly up to the so-called inflection temperature of Kovar, but any heating beyond that temperature results in such a greater relative expansion of the Kovar that the Kovar tends to pull away from the solder and cause a gap which obviously destroys the effectiveness of the seal. The net result has been that the natural advantages of zircon porcelain and its equivalents have not been utilized generally and, instead, the art apparently has been forced to turn to less satisfactory, but more compatible substitute materials. For instance, certain steatite ceramics have been bonded successfully to chrome steels or nickel-iron alloys, and, although these ceramics are an improvement in some respects over the borosilicate glass, nevertheless, they do exhibit an inherent weakness to thermal shock which presents a serious limitation that becomes increasingly serious in larger seals.

It is, therefore, an object of the present invention to provide a method and means for producing an effective seal between a ceramic and a metal that is relatively incompatible with the ceramic insofar as its coefficient of expansion is concerned.

More specifically, an object of the invention is to provide a method and means for producing an effective zircon-Kovar seal.

A further object is to provide a manner of compensating for the relatively greater linear thermal expansion of the metal component of a metal-ceramic seal so as to maintain the metal in intimate contact with the ceramic and produce a sound and effective seal.

Briefly described, the objects of the invention are accomplished by utilizing mechanical means, such as a clamp, to exert sufficient pressure on the metal to restrain the tendency of the metal to expand away from the ceramic. In circumstances where a Kovar ring is to be bonded to a ceramic body, a clamp formed of molybdenum or tungsten is wound about the circumference of the Kovar and the winding is provided with sufficient compressive strength to collapse the Kovar ring. Consequently, any expansion of the Kovar ring away from the zircon and the soldering material conventionally used, immediately is counteracted to the extent that the ring is pressed back into intimate contact with the solder. Another desirable characteristic of the winding is that it has a coefficient of expansion no greater than the zircon ceramic, so that the clamp does not lose its compressive force when subjected to thermal expansion.

As would be expected, the invention is not limited specifically to zircon-Kovar seals since the basic teaching of the invention can be utilized in obvious manners in any circumstance where one of the materials to be bonded has a greater coefficient of expansion and, consequently, has a tendency to pull away from the other material. In the zircon-Kovar seals, the tendency of Kovar to pull away from the zircon is exhibited only upon heating of the assembly beyond the so-called inflection temperature and, although these two materials are advantageous in this respect, the mechanical restraining force also could be applied in bonding materials that have differing coefficients of expansion throughout their entire heating range. It also should be understood that the word ceramic is used in the present description and claims in its broad generic sense in which it includes such other materials as porcelains and glasses.

The invention is illustrated in the accompanying drawings of which Fig. 1 is a ceramic-metal assembly illustrating the manner in which the seal of the invention is made, and Fig. 2 a plot showing linear expansion-temperature curves for certain materials adapted for use in the invention.

Referring to the drawings, the Fig. 1 assembly can be considered representative of any number of embodiments in which the principles of the invention may be utilized. As is commonly known, these ceramic-metal seals are particularly useful in all types of electronic tubes, such as X-ray tubes in which the cathode element is supported by metal and the tube itself is formed of the ceramic. However, as will be appreciated, the principles of the invention are particularly advantageous in the making of larger seals and, for this reason, the arrangement of the elements of Fig. 1 is intended to demonstrate a manner in which the large window seals of certain types of magnetrons can be made.

Referring specifically to Fig. 1 the elements there shown include a ceramic body 1 in the shape of a disc formed of a zircon porcelain, and, fitted around this body is a Kovar ring 2 which, for purposes to be described, has its lower end 3 substantially reduced in thickness. The zircon porcelain which forms body 1 is rather well known and has a number of equivalents which may also be suitable for purposes of the invention. In addition, Kovar has become a widely-used alloy particularly suitable for glass-metal seals, such an alloy being formed of 28% to 34% nickel, 5 to 25% cobalt, less than 1% manganese and the remainder iron.

In preparing to form a seal between zircon and Kovar, the edge of the zircon is metalized in the conventional manner with a coating 4 formed of titanium hydride, or other suitable metalizing materials, and next a sheet 6 of a solder, such as a silver-copper eutectic, is wound about the coated ceramic. Kovar ring 2 then is fitted about the ceramic and its solder sheet 6 and the assembly heated sufficiently to melt the solder and form an integral bond between the ceramic and the metal.

One of the principal features of the present invention lies in the fact that during such heating, the linear thermal expansions of the materials are so controlled as to prevent any separation due to variations in the expansion coefficients, and this control is mechanically provided by disposing a molybdenum or tungsten coil 7 about the exterior surface of Kovar ring 2. The difficulty which ring 7 obviates is illustrated in Fig. 2 in which it is clearly apparent that, after the so-called inflection temperature of 450° C. is reached, the linear expansion of the Kovar curve rises sharply away from that of zircon. Up to the inflection temperature, the two materials have substantially paralleling linear expansion curves, so that they expand uniformly. However, once the temperature exceeds the 450° C. mark, there is a very pronounced tendency of the Kovar to expand more rapidly than the ceramic and, consequently, to pull away from the solder. Obviously, if such were permitted, the resulting seal would be filled with gaps and would be totally ineffective.

The use of coil clamp 7 restrains any such excessive expansion of the Kovar beyond the inflection temperature and, to accomplish this result, the clamp must have certain characteristics with reference to both the Kovar and the ceramic. Thus, it is necessary to use a clamp which has a compressive strength sufficient to overcome the rigid strength of the Kovar ring so that any excess expansion or pulling away of the ring from its solid ceramic and solder center, immediately is counteracted in that the clamp collapses or forces the ring back into intimate contact with the solder. In practice, it is found preferable to provide this relative strength of the clamp by reducing the thickness of that portion of the Kovar ring which lies between the clamp and the ceramic body. This reduced portion of the Kovar ring has previously been designated by numeral 3 and, of course, the ring is sufficiently reduced in thickness to permit a clamp formed of a coil of molybdenum or tungsten wire to collapse it. Another requisite of the clamp is that it should have a coefficient of expansion which is no greater than that of the particular ceramic being used and, it is because of this that molybdenum or tungsten wire is used in conjunction with zircon porcelain body 1. In fact, the molybdenum or tungsten wire has a slightly less coefficient of expansion than the zircon ceramic, so that the coil yields slightly to the expanding ceramic and, consequently, maintains sufficient compressive strength to hold portion 3 of the Kovar ring tightly against the solder.

In practice, the use of low expansion clamps, such as wire 7, in the bonding of zircon porcelain and Kovar has resulted in vacuum tight seals of excellent quality and, as previously indicated, such a practice has been unusually effective and advantageous in the making of large magnetron window seals. However, it should be understood that the invention is not intended to be limited to these particular materials, but instead broadly contemplates the use of the low expansion clamp to form an excellent vacuum-tight seal between what heretofore have been considered as being incompatible materials.

Obviously many modifications and variations of the present invention are possible in the light of the above teachings. It is, therefore, to be understood that within the scope of the appended claims the invention may be practiced otherwise than as specifically described.

I claim:

1. A method of forming a vacuum-tight seal between a zircon-porcelain disc and a Kovar ring disposed circumferentially about the disc, said method including disposing a layer of soldering material closely about the periphery of said disc, fitting said ring closely about said solder, fitting a resilient metal clamp about the exterior surface of said ring for yieldably pressing said ring into intimate contact with said solder and heating said assemblies sufficiently to melt said solder for forming said vacuum-tight seal, said clamp being formed of a material having a coefficient of thermal expansion substantially the same as that of said disc but less than that of said ring, said clamp further having a compressive strength during said heating sufficiently greater than the rigid strength of said Kovar ring whereby said clamp effectively restrains heat expansion of said metal ring away from said disc during said heating.

2. A method according to claim 1 in which the solder material is formed of a silver-copper eutectic.

3. A method according to claim 1 in which said resilient metal clamp is formed of molybdenum wire.

4. A method according to claim 1 in which said metal clamp is formed of tungsten wire.

5. A method according to claim 1 in which said soldering material is a silver eutectic and said metal clamp is formed of molybdenum wire.

6. A method according to claim 1 in which said soldering material is a silver eutectic and said metal clamp is formed of tungsten wire.

References Cited in the file of this patent

UNITED STATES PATENTS

| Number | Name | Date |
|---|---|---|
| 1,562,533 | Weintraub | Nov. 24, 1925 |
| 1,840,724 | Koehring | Jan. 12, 1932 |
| 1,944,138 | King | Jan. 16, 1934 |
| 2,075,477 | Smith | Mar. 30, 1937 |
| 2,130,879 | Dobke | Sept. 20, 1938 |
| 2,163,409 | Pulfrich | June 20, 1939 |
| 2,163,410 | Pulfrich | June 30, 1939 |
| 2,167,431 | Bowie | July 25, 1939 |
| 2,282,106 | Underwood | May 5, 1942 |
| 2,450,130 | Gordon | Sept. 28, 1948 |
| 2,760,261 | Pawlyk | Aug. 28, 1956 |